(12) United States Patent
Borkowski et al.

(10) Patent No.: US 8,799,780 B2
(45) Date of Patent: Aug. 5, 2014

(54) INSTALLATION WIZARD WITH MULTIDIMENSIONAL VIEWS

(75) Inventors: Pawel J. Borkowski, Crakow (PL); Michal Klak, Leszno (PL); Bartlomiej T. Malecki, Slomniki (PL)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 13/305,402

(22) Filed: Nov. 28, 2011

(65) Prior Publication Data

US 2013/0139056 A1 May 30, 2013

(51) Int. Cl.
*G06F 3/00* (2006.01)
*G06F 3/048* (2013.01)
*G06F 9/445* (2006.01)
*G06F 9/44* (2006.01)

(52) U.S. Cl.
CPC *G06F 3/048* (2013.01); *G06F 9/44* (2013.01); *G06F 9/4446* (2013.01)
USPC .......................... 715/705; 715/841; 717/174

(58) Field of Classification Search
USPC .................................. 715/705, 841; 717/174
See application file for complete search history.

(56) References Cited

U.S. PATENT DOCUMENTS

| | | | |
|---|---|---|---|
| 6,560,776 B1 | 5/2003 | Breggin et al. | |
| 6,564,375 B1 | 5/2003 | Jiang | |
| 6,944,858 B2 * | 9/2005 | Luu .............................. | 717/174 |
| 7,185,334 B2 | 2/2007 | Bourke-Dunphy et al. | |
| 7,398,480 B2 | 7/2008 | Zimniewicz et al. | |
| 7,500,237 B1 | 3/2009 | Saiyed et al. | |
| 7,703,091 B1 * | 4/2010 | Martin et al. ................. | 717/174 |
| 7,840,961 B1 * | 11/2010 | Weathersby .................. | 717/177 |
| 7,975,265 B2 * | 7/2011 | Schnoebelen et al. ........ | 717/174 |
| 8,191,060 B2 * | 5/2012 | Malasky et al. ............... | 717/175 |
| 8,250,568 B2 * | 8/2012 | Dull et al. ..................... | 717/174 |
| 8,297,984 B2 * | 10/2012 | Rogers et al. ................. | 434/323 |
| 8,380,549 B2 * | 2/2013 | Haeberle et al. ................ | 705/28 |
| 2003/0028869 A1 | 2/2003 | Drake et al. | |
| 2005/0125788 A1 | 6/2005 | Lupini et al. | |
| 2008/0028392 A1 * | 1/2008 | Chen et al. .................... | 717/175 |
| 2008/0102433 A1 * | 5/2008 | Rogers et al. ................. | 434/350 |
| 2008/0244563 A1 | 10/2008 | Sonkin et al. | |
| 2010/0031248 A1 | 2/2010 | Sonkin et al. | |
| 2013/0139056 A1 * | 5/2013 | Borkowski et al. ........... | 715/705 |
| 2013/0139145 A1 | 5/2013 | Borkowski et al. | |
| 2013/0247006 A1 * | 9/2013 | Trowbridge .................. | 717/126 |
| 2013/0254741 A1 * | 9/2013 | Spassov et al. ............... | 717/110 |

OTHER PUBLICATIONS

Combined Search and Examination Report for International Application No. GB1220324.6 dated Apr. 25, 2013 6 pages.

(Continued)

*Primary Examiner* — David Phantana Angkool
(74) *Attorney, Agent, or Firm* — Stephen R. Tkacs; Stephen J. Walder, Jr.; Jeffrey S. LaBaw (57) ABSTRACT

Mechanisms are provided for consistent and coherent layout for an installation wizard. The mechanisms divide the installation wizard into a plurality of actions. The mechanisms generate a graphical user interface panel for each of the plurality of actions to form a plurality of graphical user interface panels and generate at least one optional view for each graphical user interface panel. For each given action of the installation wizard, the mechanisms present a graphical user interface panel with a default view based on context of the given action and responsive to user input selecting an optional view, present the graphical user interface panel with the selected optional view.

17 Claims, 5 Drawing Sheets

(56) References Cited

OTHER PUBLICATIONS

Wiermann, Matthias et al., "A Service and Device Monitoring Service for Smart Items Infrastructures", Proceedings of the Third International Conference on Wireless and Mobile Communications (CWMC'07), Mar. 4-9, 2007, 6 pages.

U.S. Appl. No. 13/305,468.

* cited by examiner

INSTALLATION WIZARD WITH MULTIDIMENSIONAL VIEWS

BACKGROUND

The present application relates generally to an improved data processing apparatus and method and more specifically to mechanisms for providing consistent and coherent layout for installation wizards.

A software wizard or setup assistant is a user interface type that presents a user with a sequence of dialog boxes that lead the user through a series of well-defined steps. Tasks that are complex, infrequently performed, or unfamiliar may be easier to perform using a wizard. In contrast, an expert system guides a user through a series of questions to solve a problem.

SUMMARY

In one illustrative embodiment, a method, in a data processing system, is provided for consistent and coherent layout for an installation wizard. The method comprises dividing the installation wizard into a plurality of actions. The method comprises generating a graphical user interface panel for each of the plurality of actions to form a plurality of graphical user interface panels and generating at least one optional view for each graphical user interface panel. The method further comprises, for each given action of the installation wizard, presenting a graphical user interface panel with a default view based on context of the given action and responsive to user input selecting an optional view, presenting the graphical user interface panel with the selected optional view.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for providing consistent and coherent layout for software wizards. While the mechanism applies primarily to installation wizards, the mechanism may also apply to upgrades, migrations, or any other process that is based on an interactive wizard.

Regardless of whether one uses computer workstations, notebooks, tablet computers, smartphones, or any other electronic device that can provide any framework for graphical installation interface, one must go through the installation process to use particular software. An installation wizard performs environment detection, interacts with other applications that can have very customized configuration applied, and performs various validations. As long as the process goes smoothly, the user is not concerned about the operation of the installation wizard. However, if the installation process fails, the user must rerun the installation wizard, dig into log files to find errors and their descriptions, open other documentation to find a solution, call a support center, or simply give up. Problems that occur during installation are often fatal and prevent a product from being installed. Those problems often originate from misconfiguration of customer environment or other issues not related to installation wizard code.

Installation problems may result in the user requesting assistance form the product vendor. The user may expect all obstacles to be removed very quickly, perhaps according to a signed agreement. Thus, the vendor's support team may require considerable effort to solve the problem even if the reason of the failure is logged correctly and in a meaningful way. Unfortunately, many customers, especially those who are not experienced with the particular application or set of interacting applications, find it difficult to extract the correct error log information for the vendor's support team. This may happen because there are many logs in different places related to different applications that interact between each other. The amount of information to be searched may be quite large. Inside the logged information, there may be irrelevant information about errors that are follow-up problems and not the root cause or there may be more than independent problem, which may obfuscate the overall understanding of the failure. Generally, there is a lack of action-result connection in the logs. Even if the customer finds relevant information in the log, the information does not necessarily explain the circumstances in which the error occurred. These problems result in many issues being opened unnecessarily, because the customer may have easily solved the problem by running a simple command, such as turning on the database management system, for example.

One known solution to this problem is to simplify the installation wizard. A so-called one-click installation will install the software after a single click. This approach does not allow a user to correct any erroneous data during the installation process. This approach also does not give any possibilities for customization. Using this approach, in case of failure, the user only knows the installation failed.

Some installation wizards provide a quick installation, which installs the software after showing just a couple of panels questioning about the most relevant information. This approach allows a user to customize the product in a very limited way; however, in case of error, the user knows very little about the failure.

Another known solution is to complicate the installation wizard. With a full installation, the wizard installs the software after a lot of panels overfilled with options, questions, information, and description. This approach allows a user to fully customize the software; however, one may find such a full installation approach to be irritating when the same user must perform repeated installations on multiple systems. Also, for most users, the level of detail is too high. Still, when the installation fails, the user is shown some error on the panel. The more components being used by the installed software (e.g., database management system, application server, users and their roles repository, etc.), the more difficult it is to find the real cause for an error.

Another approach is to provide an installation wizard with some monitoring tools. This approach allows the user to open some lightweight monitoring tool written for a particular installation process that is able to monitor the installation, and as soon as any problem occurs, advise the solution. Usually, there is more than one tool to be run if the installation is based on many components.

In accordance with an illustrative embodiment, a mechanism is provided to build an installation wizard in such a way that a user with a given level of general knowledge related to the software may successfully install the given product even though some problems occur during the installation process. The wizard provides the necessary information in such a way that applying the information depends on common knowledge of the user instead of the installation process restriction.

A goal of the illustrative embodiment is to reduce the number of incoming issues to the vendor's support team caused by problems during installation. The vendor's support team may then devote more time to real problems that exist in the installation wizard code rather than misconfiguration by the customer. This is done by increasing information, usability, and maintainability of the installation wizard. The installation wizard must be clear what is expected when asking the customer for input.

The installation wizard displays detailed information about activities. In the case of multiple validation attempts, or when any step is taken by the user after problem occurrence, the history of such activities should be available. The installation wizard keeps the history of validation attempts and steps taken within the boundaries of each and every activity. When a problem occurs, the installation wizard points out exactly which atomic action related to the activity causing the problem. The installation wizard presents a short summary of the problem when it occurs and provides a possible solution if one exists. The installation wizard minimizes calls to the support team resulting from failures related to the problems in the customer's environment. The installation wizard provides information about the status of all applications with which the installer interacts. The installation wizard filters out irrelevant details. This solution is incorporated into one easy-to-use installer.

The installation wizard according to the illustrative embodiment provides the user with a very intuitive and simple to use installation control center. The control center is able to guide the user through a complicated installation process. In case of failure, the installation wizard is able to point the user exactly to the problem that occurred with all relevant information including the cause of the problem, why it occurred, what pieces of software were involved, and how the problem can be solved, if possible.

The illustrative embodiment combines user input collection, simple validation, checklists, and related actions into chunks, each chunk referred to herein as an activity. An activity is represented by one or more interaction panels, each having zero or more optional views. If interaction with the user is not necessary, a particular activity may not have any interaction at all but still may have a panel. Each activity has its own context where the user input, appropriate data, logs, executed actions, etc. are kept. In this way, regardless of the navigation within the installation wizard, the contexts of all activities are preserved and may be shown on demand, such as when a user returns to a previous panel. Thus, the installation wizard solves the problem of the large amount of information to search. Information is always reduced to just the context of a single activity. With the installation wizard of the illustrative embodiment, the installation wizard may provide a history of any activity at any time.

The solution provided in the illustrative embodiments introduces different views inside every panel of the installation wizard. Depending on the panel specification, the number of views, as well as their content, may change. A first view may inform a user about health of every component that plays a role in the installation process. A second view may provide a short summary of the problem and clickable solution if possible (e.g., start database management process). A third view may show a user the consecutive steps, such as validation or other checks that are performed in the background for a particular action in form of check lists and progress bars. A fourth view may provide details of activities, such as commands executed or the like, in a very limited scope to allow the user to narrow down the problem as much as possible and user various text formatting to make the search easier. A fifth view may show the information about the environment, etc.

Thus, each activity has a multi-dimensional panel with a number of optional vies. These views provide additional perspectives (dimensions) to the activity. The views are available at any time as a dimension matrix and visualized, such as with a toolbar with a button for each view. The user is able to switch views simply by selecting the button corresponding to the desired view. In accordance with one example embodiment, inactive or unused views or views with no information may be hidden, grayed out, or disabled for selection.

Figure 1:
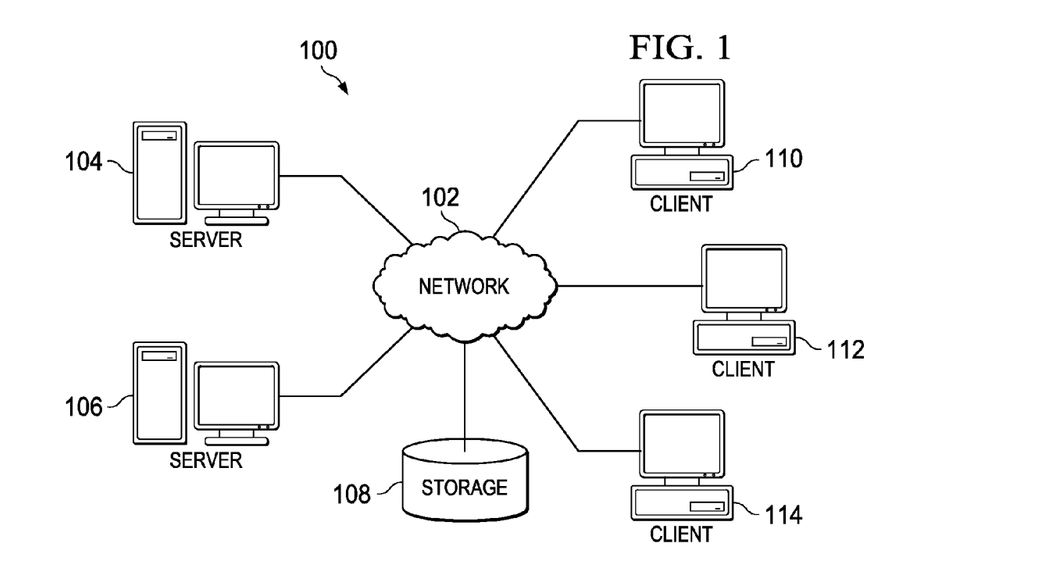
FIG. 1 depicts a pictorial representation of an example distributed data processing system in which aspects of the illustrative embodiments may be implemented.
Figure 2:
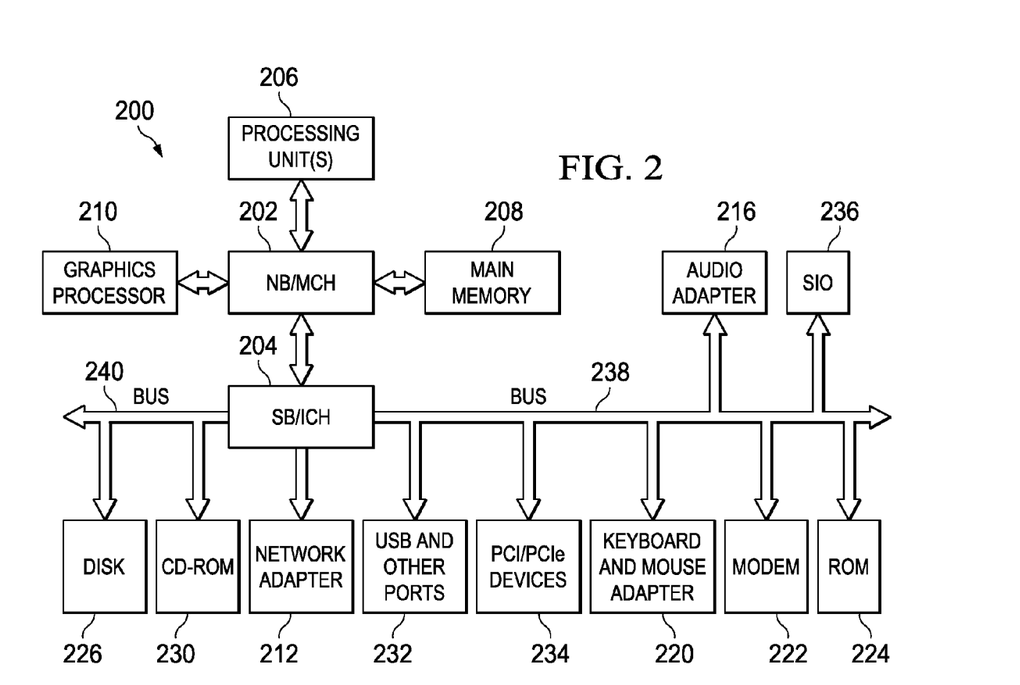
FIG. 2 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

The illustrative embodiments provide a mechanism for consistent and coherent layout for installation wizards. Although the embodiments are described with respect to installation wizards, the illustrative embodiments may apply to any type of interactive wizards. The mechanism divides the wizard into a plurality of actions to be performed and generates a panel for each action. Each panel may have a data view and a plurality of optional views. The optional views may include help view, checklist view, issues view, details view, and/or environment view. The user may switch between views simply by using a toolbar located within the panel. Using these views, all of the information is available for display if the user so chooses but remains hidden otherwise. The content of the toolbar may be changed dynamically between panels based on the context of the panel and the action being performed. Unused views or views with no information may be grayed out or have selection disabled.

A data view is analogous to a standard panel in a typical wizard. A data view within the illustrative embodiments presents messages to the user and/or collects user input. The wizard may switch the current view to the data panel automatically any time the user enters a new panel.

Figure 3:
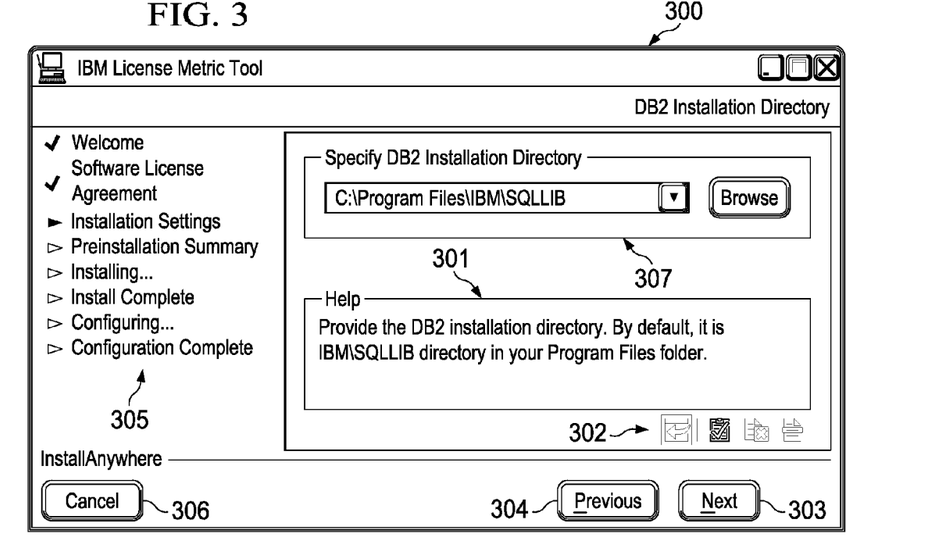
FIG. 3 depicts an example of a screen of display for a main panel with help view of an installation wizard in accordance with an illustrative embodiment.

FIG. 3 depicts an example of a screen of display for a main panel with help view of an installation wizard in accordance with an illustrative embodiment. Each panel, such as main view 300, includes overall progress portion 305, user input portion 307, view toolbar 302, next panel button 303, previous panel button 304, and cancel button 306. Overall progress portion 305 presents the overall progress of the installation wizard. Responsive to the user selecting cancel button 306, the installation wizard ends the installation. Responsive to the user selecting previous panel button 304, the installation wizard proceeds to the previous panel. Responsive to the user selecting next panel button 303, the installation wizard proceeds to the next panel.

View toolbar 302 presents the panel views that are available to be selected for the current action or panel. The options available in view toolbar 302 may be changed dynamically based on the context of the panel, action being performed, or progress of the action being performed. As seen in FIG. 3, several view options are grayed out indicating the views are not enabled for the given panel or action being performed. Responsive to the user selecting a view in view toolbar 302, the installation wizard presents the selected view in the panel.

The main data panel is similar to the common information panel of installation wizards that guides the user through the installation process by asking for required data and showing the consecutive actions. Main view 300 has quick help to explain the current state.

In the depicted example, main view 300 includes help information portion 301. The help information portion 301 may be a scrollable text area containing help text for the panel. Thus, in the example shown in FIG. 3, the help view is integrated within the main data panel, which includes an input control 307 for the user to specify an installation parameter.

In an alternative embodiment, a separate help view may provide useful information regarding the activity of the main data panel. A help view may explain in detail what is going on with the installation process during the current action. Additionally, in the case of some longer or more complicated actions, the help view may refer to learning materials for presentations including interactive educational materials such as quizzes, tutorials, presentations, etc.

Figure 4:
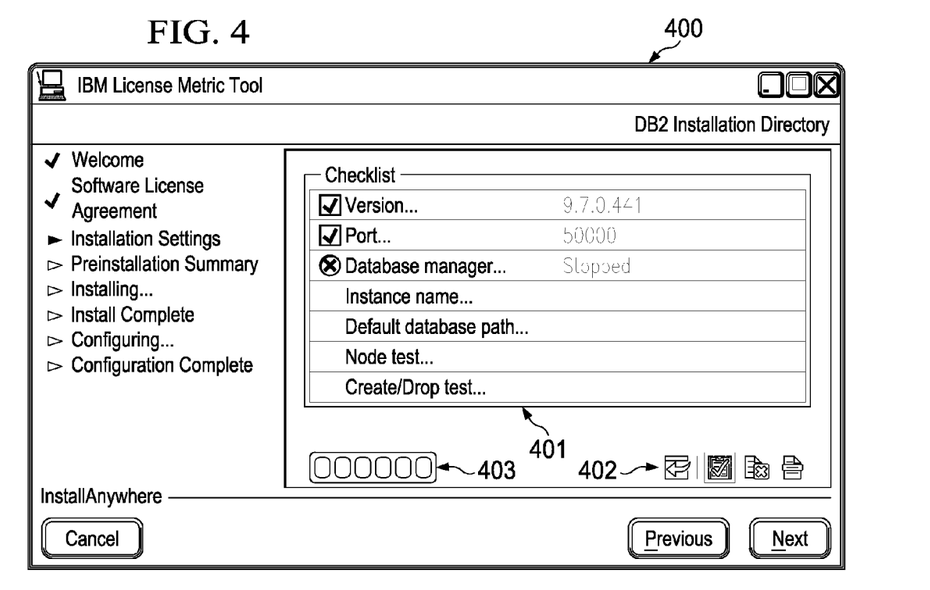
FIG. 4 depicts an example of a screen of display for a checklist view of an installation wizard in accordance with an illustrative embodiment.

FIG. 4 depicts an example of a screen of display for a checklist view of an installation wizard in accordance with an illustrative embodiment. Checklist view 400 comprises checklist item portion 401 and progress bar 403. Each item listed in checklist item portion 401 represents an atomic action and its property, which is derived from a user input field. In the depicted example, panel "DB2 selection" consists of a single user input field for a DB2 instance path and seven validation items: DB2 version, DB2 port, state of database manager, DB2 instance, default store location for the DB2 instance, result of command "drop node verify," and current user permissions to create a database in the DB2 instance. As seen in FIG. 4, the validation items include items that are validated and items that are not validated. Progress bar 403 shows the progress of the current action.

As seen in FIG. 4, view toolbar 402 has four view options enabled.

Figure 5:
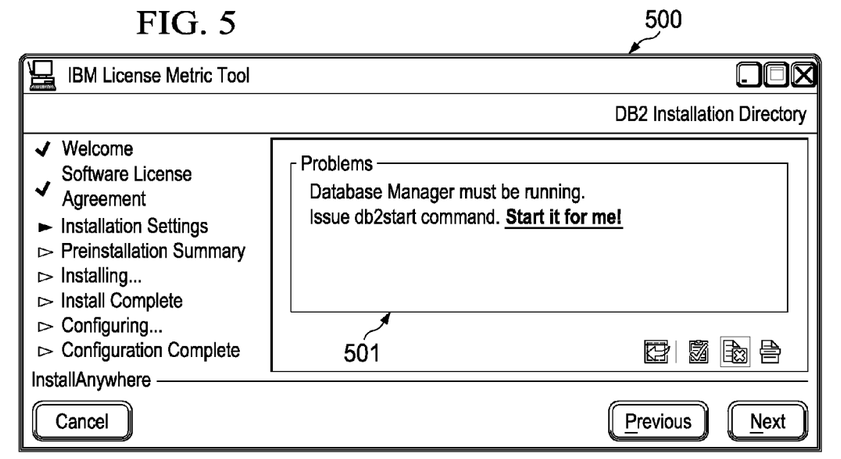
FIG. 5 depicts an example of a screen of display for an issues view of an installation wizard in accordance with an illustrative embodiment.

FIG. 5 depicts an example of a screen of display for an issues view of an installation wizard in accordance with an illustrative embodiment. Issues view 500 includes an issues information portion 501, which contains a short summary of errors and warnings coming from the validation of user input as well as cross-validation that is performed behind the scenes and any other installation steps. The issues information portion 501 is reset every time a user input is changed. In case of validation failure, the wizard may switch to issues view 500 automatically and provide information about the error with appropriate explanations, steps to take to correct the current state, default inputs, available inputs, etc.

As an example, consider the situation where the user wants to install a database on an existing database management system (DBMS) but the DBMS is stopped. The user runs the database installation action within the installation wizard, and the installation wizard automatically moves to the issues view 500 showing the information, "DBMS is stopped. Click the following link to start it: START." This view presents a short summary of the issue when it occurs and provides a possible solution.

Figure 6:
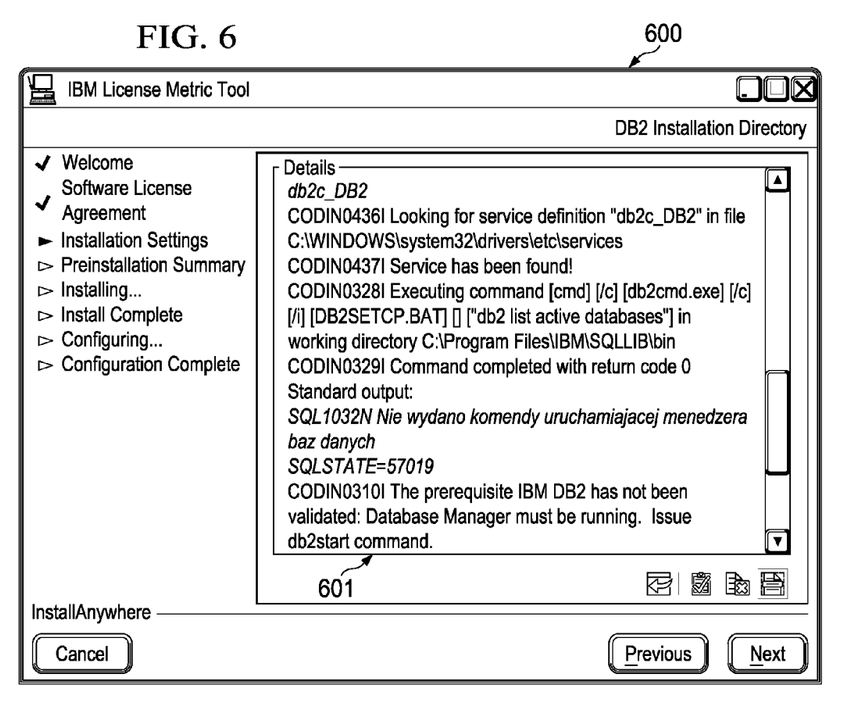
FIG. 6 depicts an example of a screen of display for a details view of an installation wizard in accordance with an illustrative embodiment.

FIG. 6 depicts an example of a screen of display for a details view of an installation wizard in accordance with an illustrative embodiment. Details panel 600 includes details information portion 601, which details wizard activities. Details information portion 601 may provide different text formatting and colors for various kinds of messages, such as information, warning, error, standard output, error output, or structured query language (SQL) query.

Details panel 600 also may include a history of actions performed by the installation wizard in the background. In particular, details panel 600 may show details about external commands being run (command, return code, standard output, standard error output), SQL queries being executed (query text, number of rows returned, etc.), opening/closing Java™ database connectivity (JDBC) connections. Details are not reset between validations, although the start of the validation is clearly marked with a time stamp, and contain only entries related to the given panel. Therefore, the user may consider the details panel 600 as a panel history.

Details panel 600 may be integrated with logs. Thus, every entry added to the details log may also appear in translated logs. Additionally, details panel 600 may provide copy/paste functionality to enhance interaction between the customer and the installed software support.

The details view displays details of wizard activities triggered by the user or by the installer itself together with the effect of them across the whole environment. The details view may present the information created in different places, such as console output, logs, memory, etc., as well as different locations, which may be appropriate for the applications the installation wizard interacts with, for example.

To increase usability for this important view, the installation wizard may provide different functions, such as text formatting or different colors for various kinds of messages. For example, information by be displayed in blue, warnings may be displayed in bold orange, errors may be displayed in bold red, standard output may be displayed in black, error output may be displayed in red, and queries may be displayed in green.

An environment view (not shown) may be provided. The environment view depends on the aspects related to the environment where the installation wizard runs. The environment view may describe the operating system with its settings, a browser that supports the installation wizard with its job, or a distributed environment configuration where the product is being installed. Monitoring those aspects inside the installation process reduces problems raised by customers related to such things as lack of memory, unsupported operating system, disconnected machine, etc.

Figure 7:
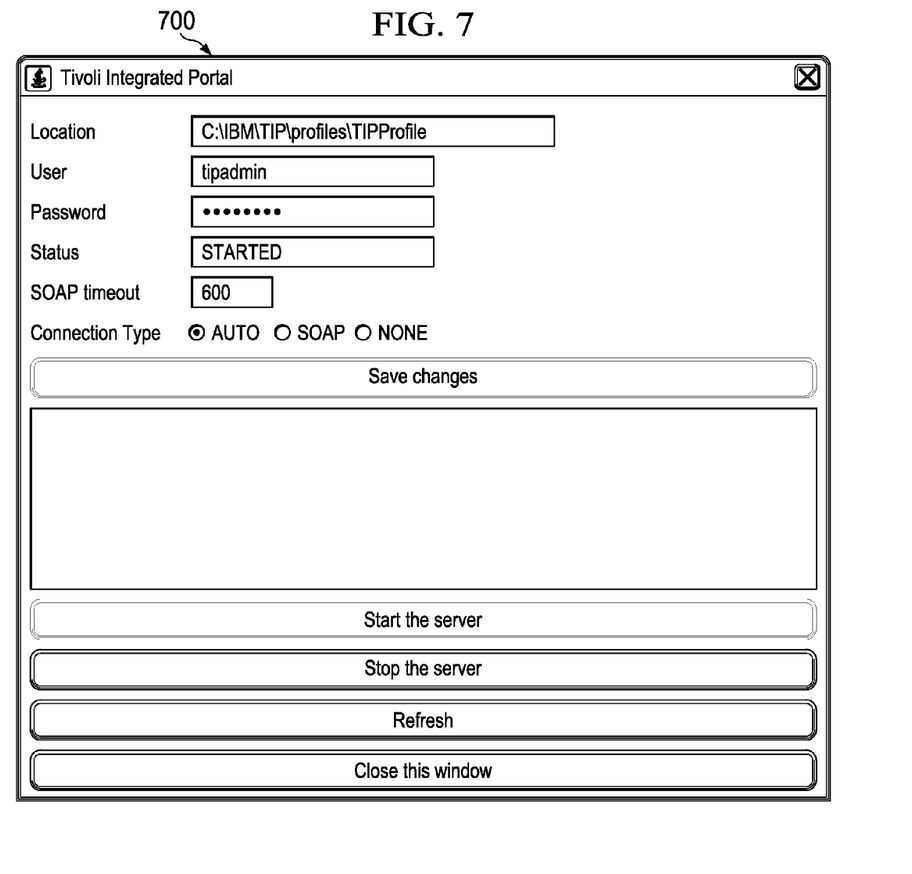
FIG. 7 depicts an example of a screen of display for an application view of an installation wizard in accordance with an illustrative embodiment.

FIG. 7 depicts an example of a screen of display for an application view of an installation wizard in accordance with an illustrative embodiment. The content of the environment view, as well as dialog window 700, which is triggered by the view, depends fully on panel content. That is, dialog window 700 depends on what is considered as the environment relevant to the user input being collected on a particular panel. Dialog window 700 may present operating system details or any data related to a particular component (e.g., details of Tivoli® Integrated Portal application container on which the product is being installed).

While the illustrative embodiments described herein show various views of the installation wizard, the invention should not be limited to these views. An installation wizard in accordance with the illustrative embodiments may include more or fewer views. Additional views may be added using the open architecture of the illustrative embodiments.

Moreover, by using a filtering mechanism on all panels, particularly in the details view, the installation wizard of the illustrative embodiments shows only data appropriate for the current action. For example, if one view consists of logs related to database management system (DBMS) and part of the installation process is creating a database on such DBMS, the details view may show only logs related to database creation, filtering out all other logs produced by the DBMS. Using this solution solves the problem of irrelevant information inside the logs that may be misleading to the user. Any unrelated errors may be ignored.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 8:
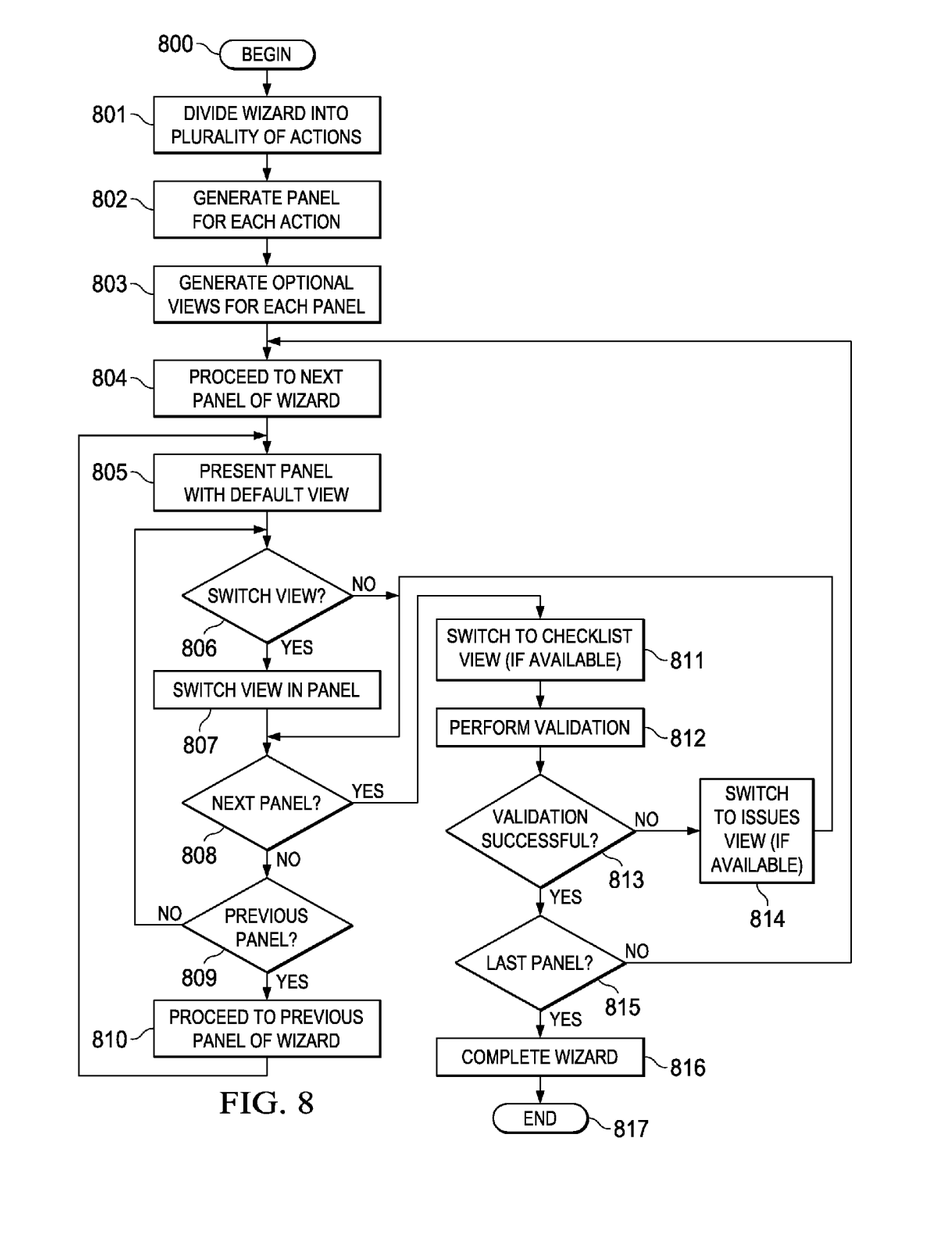
FIG. 8 is a flowchart illustrating operation of a mechanism for consistent and coherent layout for an installation wizard in accordance with an illustrative embodiment.

FIG. 8 is a flowchart illustrating operation of a mechanism for consistent and coherent layout for an installation wizard in accordance with an illustrative embodiment. Operation begins in block 800, and the mechanism divides the wizard into a plurality of actions (block 801). The mechanism generates a panel for each action (block 802) and generates optional views for each panel in the installation wizard (block 803). The optional views may include at least one of a help view, checklist view, issues view, a details view, and an environment view.

The mechanism proceeds to the next panel of the wizard, which at this point is the first panel (block 804). The mechanism then presents the panel with a default view (block 805). The default view may be a standard data view, for example, although the default view may vary depending on the context of the installation wizard and the current panel.

The mechanism determines whether the user selects to switch the view of the panel (block 806). If the user selects to switch the view, the mechanism switches the view in the current panel of the wizard (block 807). Thereafter, or if the user does not select to switch the view in block 806, the mechanism determines whether the user selects to proceed to the next panel (block 808). If the user does not select to proceed to the next panel, the mechanism determines whether the user selects to return to the previous panel (block 809). If the user does not select to return to the previous panel, operation returns to block 806 to determine whether the user selects to switch views.

If the user does select to return to the previous panel in block 809, the mechanism proceeds to the previous panel of the wizard (block 810). Then, operation returns to block 805 to present the panel with a default view.

Returning to block 808, if the user does select to proceed to the next panel, the mechanism switches to checklist view, if available (block 811) and performs validation (block 812). The mechanism determines whether validation is successful (block 813). If validation is not successful, the mechanism switches to issues view, if available (block 814), and operation returns to block 808 to determine whether the user selects to proceed to the next panel. If validation is successful in block 813, the mechanism determines whether the current panel is the last panel (block 815). If the current panel is not the last panel, operation returns to block 804 to proceed to the next panel in the wizard. If the current panel is the last panel in block 815, the mechanism completes the wizard (block 816), and operation ends in block 817.

Thus, the illustrative embodiments provide mechanisms for consistent and coherent layout for an installation wizard. The mechanisms divide the installation wizard into a plurality of actions. The mechanisms generate a graphical user interface panel for each of the plurality of actions to form a plurality of graphical user interface panels and generate at least one optional view for each graphical user interface panel. For each given action of the installation wizard, the mechanisms present a graphical user interface panel with a default view based on context of the given action and responsive to user input selecting an optional view, present the graphical user interface panel with the selected optional view.

With the illustrative embodiments, a user is able to switch between views to have deeper knowledge of what is occurring and to be able to investigate the problem, if a problem occurs, from different perspectives. The user can start or refresh any component if it requires such action. The user knows precisely which step from the check list failed. The user is able to see all of the commands that were executed one-by-one and see, when necessary, if such order may cause a problem. The user can easily monitor the logs online for any particular component, action, or installation phase.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for consistent and coherent layout for an installation wizard, the method comprising:
   dividing the installation wizard into a plurality of actions;
   generating a graphical user interface panel window for each of the plurality of actions to form a plurality of graphical user interface panel windows;
   generating a plurality of optional views for each graphical user interface panel window, wherein each graphical user interface panel window comprises a views toolbar comprising a graphical icon for selecting each optional view relevant to the respective action; and
   for each given action of the installation wizard, presenting a graphical user interface panel window with a default view based on context of the given action and responsive to user input selecting an optional view, presenting the graphical user interface panel window with the selected optional view,
   wherein the plurality of optional views comprise at least two of a help view presenting interactive help information for the given action, a checklist view presenting a checklist of validation items for the given action, an issues view presenting a summary of errors and warnings for the given action, a details view presenting details of wizard activities for the given action, or an environment view for the given action.

2. The method of claim 1, wherein the checklist view comprises a progress bar.

3. The method of claim 1, wherein the details view comprises copy-and-paste functionality for the given action.

4. The method of claim 1, wherein the details view presents a history of actions performed in the background for the given action comprising at least one of commands being run, queries being executed, or opening or closing of connections.

5. The method of claim 1, wherein the default view comprises a data view for the given action.

6. The method of claim 5, wherein the graphical user interface panel window integrates an interactive help view into the data view.

7. A computer program product comprising a computer readable storage medium having a computer readable program stored therein, wherein the computer readable program, when executed on a computing device, causes the computing device to:
   divide an installation wizard into a plurality of actions;
   generate a graphical user interface panel window for each of the plurality of actions to form a plurality of graphical user interface panel windows;
   generate a plurality of optional views for each graphical user interface panel window, wherein each graphical user interface panel window comprises a views toolbar comprising a graphical icon for selecting each optional view relevant to the respective action; and
   for each given action of the installation wizard, present a graphical user interface panel window with a default view based on context of the given action and responsive to user input selecting an optional view, present the graphical user interface panel window with the selected optional view,
   wherein the plurality of optional views comprise at least two of a help view presenting interactive help information for the given action, a checklist view presenting a checklist of validation items for the given action, an issues view presenting a summary of errors and warnings for the given action, a details view presenting details of wizard activities for the given action, or an environment view for the given action.

8. The computer program product of claim 7, wherein the details view presents a history of actions performed in the background for the given action comprising at least one of commands being run, queries being executed, or opening or closing of connections.

9. The computer program product of claim 7, wherein the default view comprises a data view.

10. The computer program product of claim 9, wherein the graphical user interface panel window integrates an interactive help view into the data view.

11. The computer program product of claim 7, wherein the computer readable program is stored in a computer readable storage medium in a data processing system and wherein the computer readable program was downloaded over a network from a remote data processing system.

12. The computer program product of claim 7, wherein the computer readable program is stored in a computer readable storage medium in a server data processing system and wherein the computer readable program is downloaded over a network to a remote data processing system for use in a computer readable storage medium with the remote system.

13. An apparatus, comprising:
    a processor; and
    a memory coupled to the processor, wherein the memory comprises instructions which, when executed by the processor, cause the processor to:
    divide the installation wizard into a plurality of actions;
    generate a graphical user interface panel window for each of the plurality of actions to form a plurality of graphical user interface panel windows;
    generate a plurality of optional views for each graphical user interface panel window, wherein each graphical user interface panel window comprises a views toolbar comprising a graphical icon for selecting each optional view relevant to the respective action; and
    for each given action of the installation wizard, present a graphical user interface panel window with a default view based on context of the given action and responsive to user input selecting an optional view, present the graphical user interface panel window with the selected optional view,
    wherein the plurality of optional views comprise at least two of a help view presenting interactive help information for the given action, a checklist view presenting a checklist of validation items for the given action, an issues view presenting a summary of errors and warnings for the given action, a details view presenting details of wizard activities for the given action, or an environment view for the given action.

14. The apparatus of claim 13, wherein the details view comprises copy-and-paste functionality for the given action.

15. The apparatus of claim 13, wherein the details view presents a history of actions performed in the background for the given action comprising at least one of commands being run, queries being executed, or opening or closing of connections.

16. The apparatus of 13, wherein the default view comprises a data view.

17. The apparatus of claim 16, wherein the graphical user interface panel window integrates an interactive help view into the data view.

* * * * *